United States Patent
Debray et al.

(10) Patent No.: US 10,746,056 B2
(45) Date of Patent: Aug. 18, 2020

(54) REINFORCED EXHAUST CASING AND MANUFACTURING METHOD

(71) Applicant: Safran Aircraft Engines, Paris (FR)

(72) Inventors: Benoit Argemiro Matthieu Debray, Moissy-Cramayel (FR); Jeremie Sylvain Bonnaudet, Moissy-Cramayel (FR); Gregory Ghosarossian-Prillieux, Moissy-Cramayel (FR); Nicolas Rene Bruno Michelidakis, Moissy-Cramayel (FR); Guillaume Sevi, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 258 days.

(21) Appl. No.: 15/710,026

(22) Filed: Sep. 20, 2017

(65) Prior Publication Data
US 2018/0080345 A1 Mar. 22, 2018

(30) Foreign Application Priority Data

Sep. 21, 2016 (FR) ...................................... 16 58862

(51) Int. Cl.
*F01D 25/28* (2006.01)
*F01D 25/16* (2006.01)
*F01D 25/24* (2006.01)

(52) U.S. Cl.
CPC .......... *F01D 25/28* (2013.01); *F01D 25/162* (2013.01); *F01D 25/243* (2013.01);
(Continued)

(58) Field of Classification Search
CPC ...... F01D 25/162; F01D 25/243; F01D 25/28; F05D 2240/90; F05D 2260/30; Y02T 50/671
See application file for complete search history.

(56) References Cited

U.S. PATENT DOCUMENTS

| | | | | | |
|---|---|---|---|---|---|
| 5,259,183 A | * | 11/1993 | Debeneix | ............... | B64D 27/18 244/54 |
| 10,371,009 B2 | * | 8/2019 | De Sousa | ............... | B64D 27/26 |

(Continued)

FOREIGN PATENT DOCUMENTS

| EP | 2 003 293 A1 | 12/2008 |
|---|---|---|
| EP | 2 251 540 A2 | 11/2010 |

(Continued)

OTHER PUBLICATIONS

French Preliminary Search Report dated May 9, 2017 in Patent Application No. FR 1658862 (with English translation of categories of cited documents).

*Primary Examiner* — Carl C Staubach
(74) *Attorney, Agent, or Firm* — Oblon, McClelland, Maier & Neustadt, L.L.P.

(57) ABSTRACT

An exhaust casing of a turbine engine for an aircraft which extends along an axis and includes: a central hub, an annular outer shroud and arms which connect the central hub to the outer shroud, at least one yoke for attaching the exhaust casing to the turbine engine being located on the outer shroud and forming at least one lug extending in a plane perpendicular to the axis and protruding toward the exterior of the outer shroud. The outer shroud includes ribs which form a constant excess of the outer shroud, which are located on either side of the at least one lug of the at least one yoke, and which are aligned with the at least one lug.

9 Claims, 7 Drawing Sheets

(52) U.S. Cl.
CPC ...... *F05D 2240/90* (2013.01); *F05D 2260/30* (2013.01); *Y02T 50/671* (2013.01)

(56) References Cited

U.S. PATENT DOCUMENTS

| | | | |
|---|---|---|---|
| 2008/0310958 A1 | 12/2008 | Bader et al. | |
| 2010/0111685 A1* | 5/2010 | Sjunnesson | F01D 5/3023 |
| | | | 415/200 |
| 2010/0290903 A1* | 11/2010 | Heyerman | B64D 27/26 |
| | | | 415/213.1 |
| 2014/0077027 A1* | 3/2014 | Durand | B64D 27/26 |
| | | | 244/54 |
| 2015/0175268 A1* | 6/2015 | Guillou | B64D 27/26 |
| | | | 244/54 |
| 2016/0146051 A1* | 5/2016 | Debray | F01D 25/162 |
| | | | 415/211.2 |
| 2017/0030222 A1 | 2/2017 | De Sousa et al. | |
| 2018/0195416 A1* | 7/2018 | Jouy | F01D 9/065 |

FOREIGN PATENT DOCUMENTS

| | | |
|---|---|---|
| FR | 3 016 660 A1 | 7/2015 |
| WO | WO 2008/121047 A1 | 10/2008 |
| WO | WO 2015/004059 A1 | 1/2015 |

\* cited by examiner

Assemble a first panel with second panels — 100

Machine the exterior wall of the outer shroud — 200

REINFORCED EXHAUST CASING AND MANUFACTURING METHOD

GENERAL TECHNICAL FIELD

The present invention relates to an exhaust casing for a turbine engine for an aircraft.

More precisely, it relates to an exhaust casing reinforced so as to increase the resistance of said exhaust casing against mechanical forces, and particularly to buckling.

The present invention also relates to a manufacturing method for such a reinforced exhaust casing.

The present invention also relates to a turbine engine for an aircraft comprising such a reinforced exhaust casing.

PRIOR ART

A turbine engine has a main direction extending along a longitudinal axis, and typically comprises, from upstream to downstream in the gas flow direction, a fan, a low-pressure compressor, a high-pressure compressor, a combustion chamber, a high-pressure turbine, a low-pressure turbine, and an exhaust casing (or "TRF" according to the aeronautical term, TRF being the acronym of the well-known term "Turbine Rear Frame") located directly at the outlet of said low-pressure turbine.

The exhaust casing comprises:

an annular hub which is centered on the axis of the turbine engine, an outer shroud, coaxial with the hub, which forms a ring with a diameter greater than the hub, and arms, or sleeves, connecting the hub and the outer shroud.

The space formed between the hub and the outer shroud forms a flow channel for the primary stream at the outlet of the low-pressure turbine.

In order to attach the exhaust casing to a turbine engine support, yokes protruding from the outer shroud which form attachment points are provided on the exterior wall of said outer shroud. These yokes have lugs which extend radially outward from the outer shroud and which have bores for receiving attachment rods.

New generations of turbine engines tend to increase the diameter of the exhaust casing, and particularly of the outer shroud. Thus, for example, the attachment flange located on the edge of the outer shroud, for attaching the exhaust casing to the low-pressure turbine, can have a diameter greater than 2000 mm for new generation exhaust casings.

Such an increase in the diameter of the outer shroud tends to weaken the resistance of said outer shroud to buckling. This buckling weakness impacts in particular the resistance of the shroud to very high loads which can occur during an incident, particularly the loss of a fan blade (or "FBO" for "Fan Blade Out" according to the well-known aeronautical term).

Reinforced exhaust casing of the type of the exhaust casing 1 are known for a turbine engine illustrated in FIG. 1. The exhaust casing 1 comprises a hub 2 connected to a shroud 3 by arms 4. The reinforcement of the exhaust casing 1 is ensured by a stiffener 5 attached at each of its two ends to a yoke 6, so as to interconnect two adjacent yokes. The stiffener 5 is attached by a flange arranged in a bore formed in each of the yokes 6.

Such a casing has, for example, already been proposed in document FR3016660.

It does not, however allow a sufficient increase in buckling resistance of the exhaust casing 1, and particularly in the shroud 3, while keeping the mass of the exhaust casing 1 as low as possible.

Also known is document WO2008/121047, which describes a casing of a turbine engine which comprises an inner hub connected by arms to an outer shroud. An attachment part allowing the casing to be attached to the turbine engine is attached to the outer shroud, said attachment part comprising lugs connected by ribs.

However, the solution described in document WO2008/121047 does not allow sufficient resistance to be added, the fact of attaching an attachment part to the outer shroud limiting the resistance of the outer shroud.

GENERAL PRESENTATION OF THE INVENTION

A general aim of the invention is to propose a solution allowing an increase in the resistance to buckling of an exhaust casing of a turbine engine, without increasing the mass of said exhaust casing.

Another aim of the invention is to propose a solution allowing the mass of an exhaust casing of a turbine engine to be reduced while still maintaining the same resistance to buckling.

One aim of the invention can also be to propose a solution allowing the resistance to buckling of an exhaust casing of a turbine engine to be increased, while increasing the mass of said exhaust casing in a limited manner.

An additional aim of the invention is to simplify the manufacture of the casing.

More particularly, according to a first aspect, the invention proposes an exhaust casing of a turbine engine for an aircraft, said exhaust casing extending along an axis and comprising a central hub, an annular outer shroud and arms which connect the central hub to the outer shroud, at least one yoke for attaching the exhaust casing to the turbine engine being located on the outer shroud and forming at least one lug extending in a plane perpendicular to the axis and protruding toward the exterior of said outer shroud, the outer shroud also comprising ribs which are located on either side of said at least one lug of said at least one yoke, and which are aligned with said at least one lug.

The exhaust casing can also comprise the following features alone, or in all technically possible combinations:

two yokes are formed on the outer shroud, the ribs formed on said outer shroud comprising a central rib interconnecting the lugs of said two yokes, and two exterior ribs connected to a single lug;

the arms each comprise a top connected to the outer shroud and a root connected to the central hub, and wherein two ribs comprise an end which stops with each facing the top of an arm;

the arms comprise, on the one hand, a yoke arm located facing a yoke, and on the other hand non-yoke arms, forming the rest of said arms, said non-yoke arms comprising a first non-yoke arm and a second non-yoke arm which are both adjacent to said yoke arm, the end of the two ribs stopping respectively facing the top of the first non-yoke arm and facing the top of the second non-yoke arm;

the outer shroud comprises:

a first zone corresponding to the ribs on which said outer shroud has a first thickness;

a second zone extending from the top of the first non-yoke arm to the top of the second non-yoke arm while covering the top of the yoke arm, and on which said outer shroud has a second thickness which is smaller than the first thickness;

a third zone extending over the rest of said outer shroud and on which said outer shroud has a third thickness which is smaller than the second thickness;

the at least one yoke comprises two parallel lugs which are spaced from one another, and wherein the outer shroud comprises two rows of ribs located on either side of each of the two lugs and which are parallel and axially spaced from one another;

the exhaust casing is an exhaust casing with tangential arms.

According to a second aspect, the invention proposes a turbine engine for aircraft comprising an exhaust casing according to the first aspect.

According to a third aspect, the invention proposes a method for manufacturing an exhaust casing according to the first aspect comprising the following steps:

assembling at least one first panel with second panels, said at least one first panel forming an annular portion along an axis of an outer shroud can comprising at least one yoke which forms at least one lug extending in a plane perpendicular to the axis and protruding toward the exterior of said at least one first panel, said at least one first panel further comprising ribs which are located on either side of said at least one lug of said at least one yoke, and which are aligned with said at least one lug, the second panels each forming an annular portion along the axis of the outer shroud.

According to a fourth aspect, the invention proposes a method for manufacturing an exhaust casing according to the first aspect comprising the following steps:

machining an external wall of an annular outer shroud along an axis which comprises at least one yoke which forms at least one lug extending in a plane perpendicular to the axis while protruding toward the exterior of said outer shroud, forming ribs on either side of said at least one lug of said at least one yoke, and which are aligned with said at least one lug.

DESCRIPTION OF THE FIGURES

Other features, aims and advantages of the present invention will appear upon reading the detailed description that follows, and with reference to the appended drawings, given by way of non-limiting examples and wherein.

DESCRIPTION OF ONE OR MORE EXEMPLARY EMBODIMENTS

Figure 1:
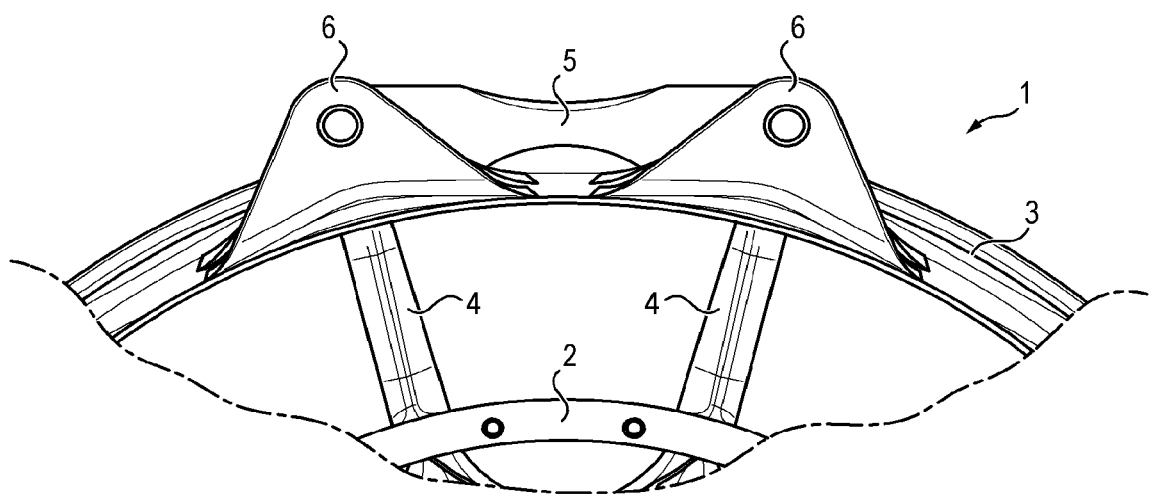
FIG. 1 shows a front view of a portion of an exhaust casing according to the prior art.
Figure 2:
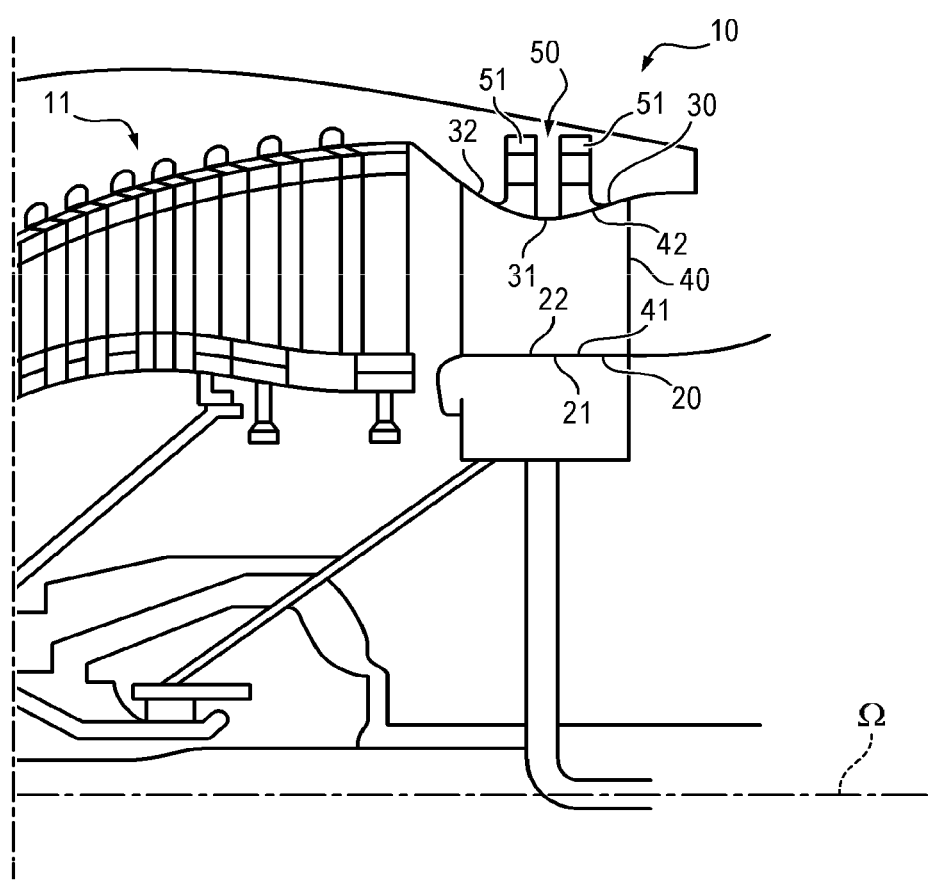
FIG. 2 shows a half-view of an exhaust casing according to a possible embodiment of the invention which is mounted in a turbine engine of an aircraft wherein said exhaust casing comprises at least one yoke forming at least two lugs.

Shown in FIG. 2 use an exhaust casing 10 connected to a low-pressure turbine 11 of a turbine engine for an aircraft. The exhaust casing 10 is a part extending along an axis $\Omega$ which is the axis of the turbine engine, the radial direction of the exhaust casing being perpendicular to the axis $\Omega$.

As shown in FIG. 2, the exhaust casing 10 comprises a central hub 20 which is an annular part centered on the axis $\Omega$ of the turbine engine, an outer shroud 30 which is also an annular part centered on the axis $\Omega$ of the turbine engine, and arms 40 which connect the central hub 20 to the outer shroud 30 by being distributed radially over the edge of the central hub 20.

The central hub 20 comprises an inner wall 21 directed toward the interior of the central hub 20, and an outer wall 22 directed toward the exterior of the central hub 20, as well as toward the outer shroud 30.

The outer shroud comprises an inner wall 31 directed toward the interior of the outer shroud 30, as well as toward the central hub 20, and in outer wall 32 directed toward the exterior of said outer shroud 30.

The arms 40 comprise a root 41 connected to the outer wall 22 of the central hub, and top 42 connected to the inner wall 31 of the outer shroud 30.

As illustrated in FIGS. 2 to 7, at least one yoke 50 for attaching the exhaust casing 10 to the turbine engine is located on the outer wall 32 of the outer shroud 30. In the example illustrated in FIG. 3, the outer shroud 30 comprises three yokes 50, however said outer shroud can a greater or smaller number of yokes 50. The outer shroud 30 can for example have a single yoke 50.

The yokes 50 each form at least one lug 51 protruding radially toward the exterior of the outer shroud 30 which comprises a bore so as to attach the yokes 50 to attachment elements of the turbine engine by rods positioned in the bores. The lugs 51 are fins with rounded shapes located in a plane perpendicular to the axis $\Omega$.

In the exemplary embodiment shown in FIG. 2, the yokes 50 are U-shaped parts each comprising two parallel lugs 51 which are spaced axially from one another. However, the yokes 50 can form a greater or smaller number of lugs 51. For example, the yokes 50 can form only a single lug 51. The yokes 50 all comprise the same number of lugs 51, and said lugs 51 of the yokes 50 are aligned in the same plane(s) perpendicular to the axis $\Omega$. Thus, as in the example illustrated in FIG. 2, when the yokes 50 form two lugs 51, then the outer shroud 30 comprises two rows of parallel lugs 51 spaced axially from one another.

Figure 3:
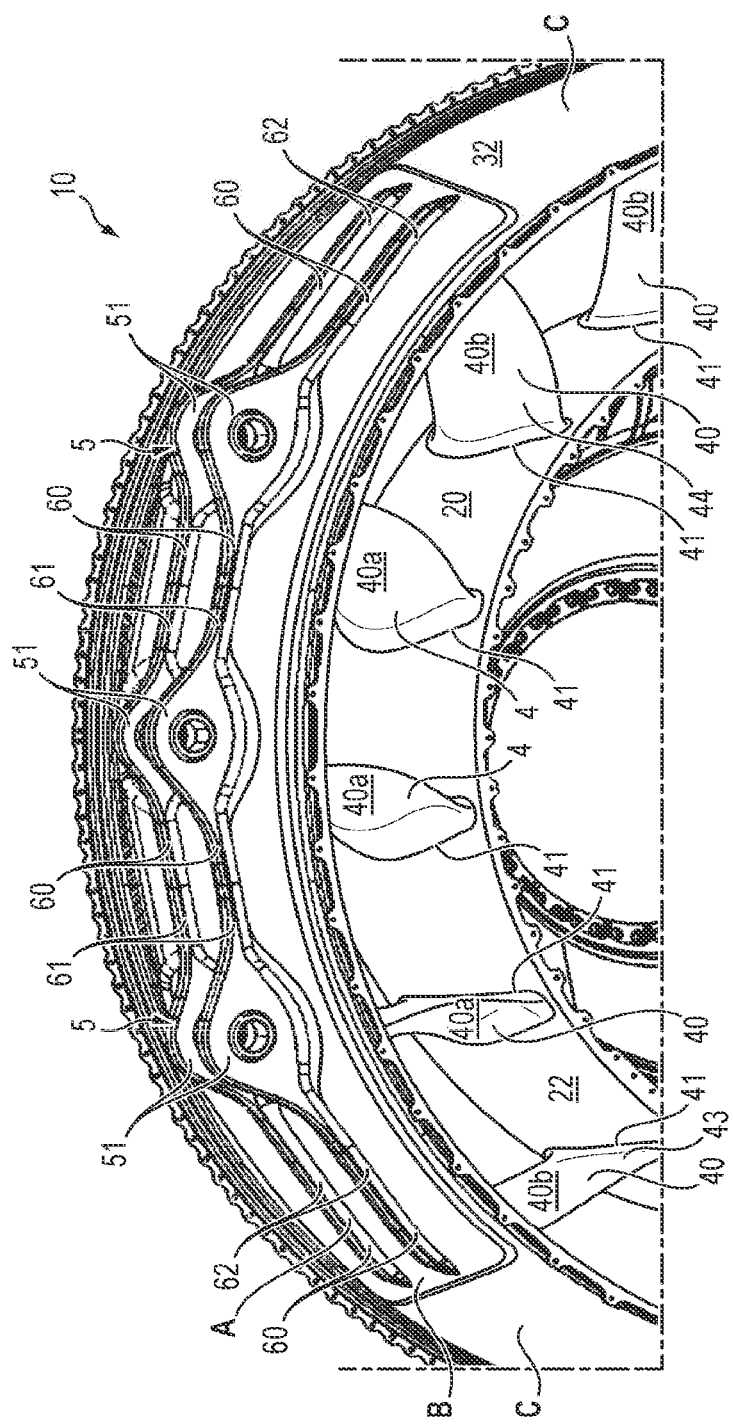
FIG. 3 shows a perspective view of a portion of the exhaust casing according to a possible embodiment of the invention wherein said exhaust casing comprises three yokes each forming two lugs.
Figure 4:
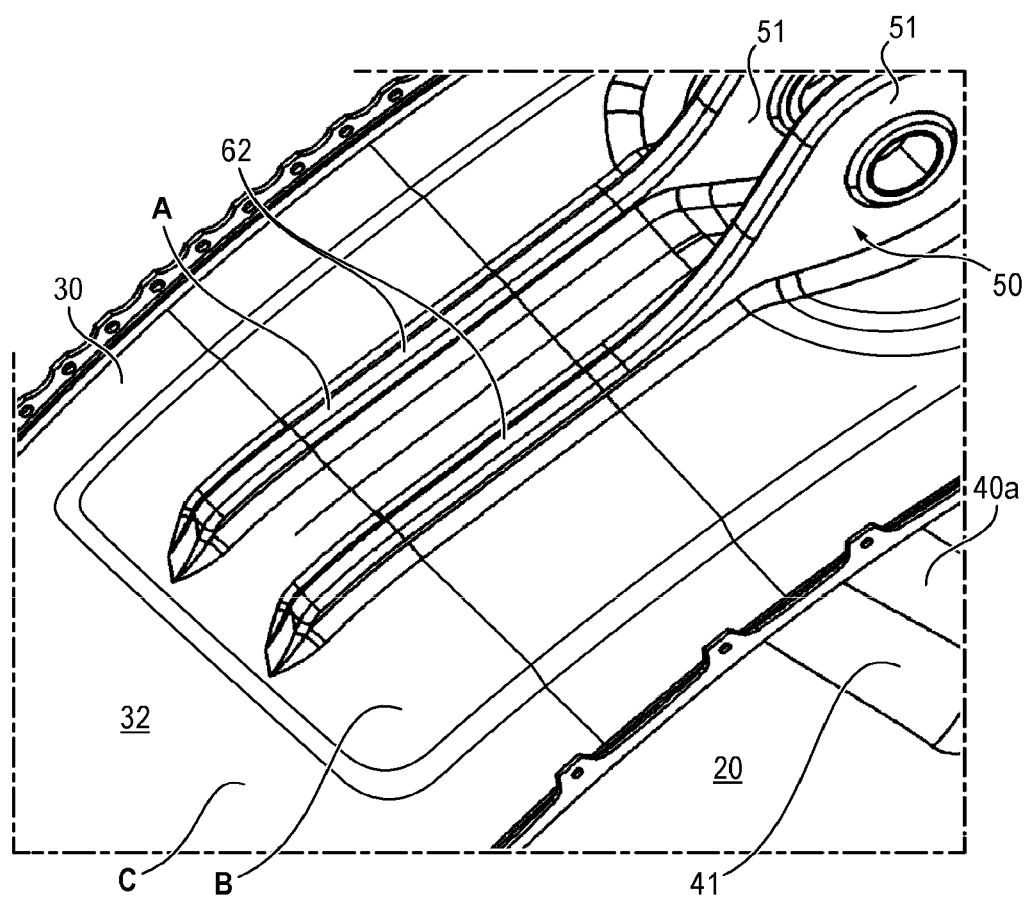
FIG. 4 shows a detailed view of the embodiment illustrated in FIG. 3 at the exterior ribs located facing a first non-yoke arm.
Figure 5:
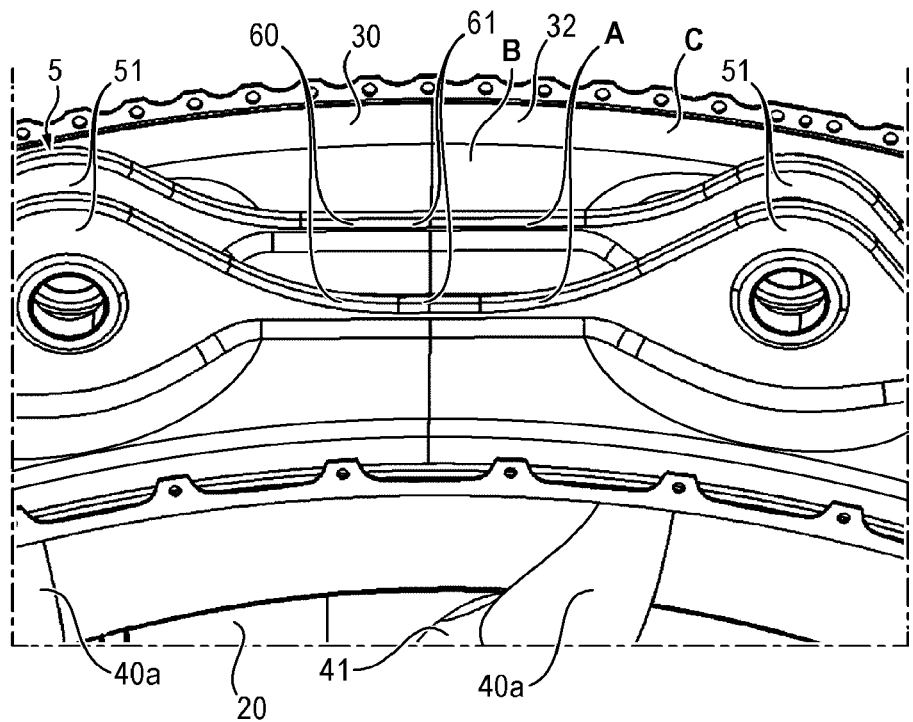
FIG. 5 shows a detailed view of the embodiment illustrated in FIG. 3 at the central ribs.
Figure 6:
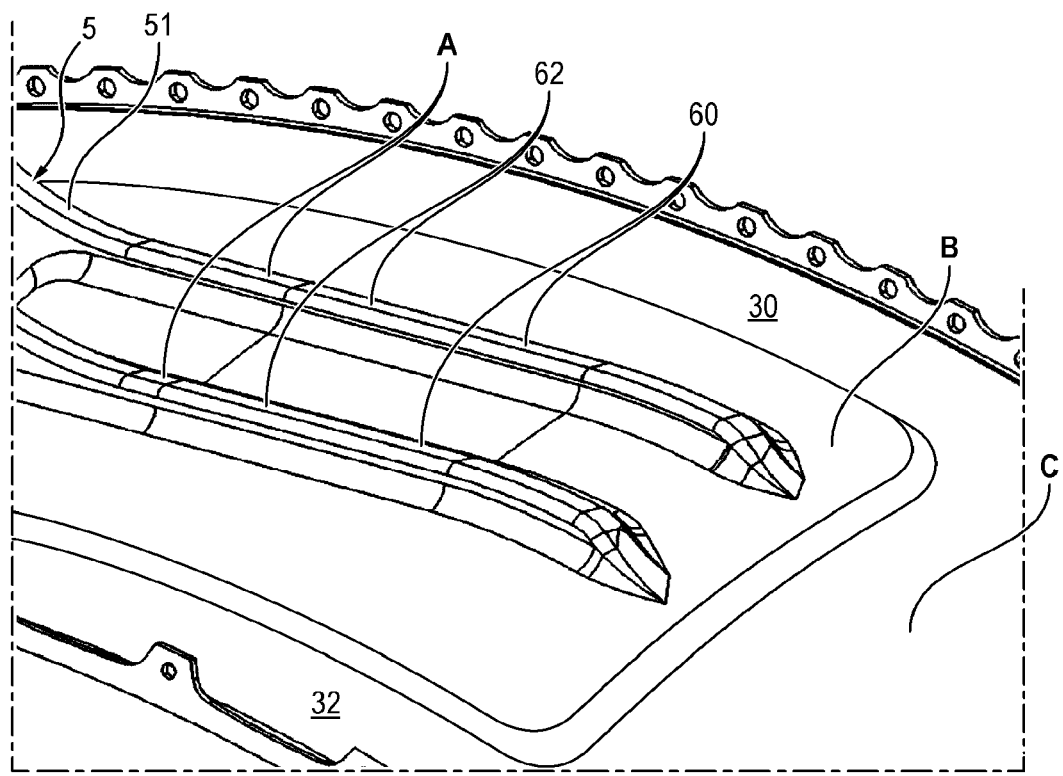
FIG. 6 shows a detailed view of the embodiment illustrated in FIG. 3 at the exterior ribs located facing a second non-yoke arm.

The arms 40, which are visible in FIG. 3, comprise two categories of arm 40, on the one hand the yoke arms 40a located radially facing the yokes 50, and on the other hand the non-yoke arms 40b which correspond to the rest of said arms 40. To put it another way, at the top 42 of the yoke arms 40a is located a yoke 50, while at the top 42 of the non-yoke arms 40b there is not yoke 50. A reinforcement can be formed under the root 41 of the yoke arms 40a on the central hub 20.

The non-yoke arms 40*b* comprise a first non-yoke arm 43 and a second non-yoke arm 44 which are the two non-yoke arms 40*b* which are adjacent to the yoke arms 40*a* and which are located on either side of said yoke arms 40*a*. In the embodiment wherein the outer shroud 30 comprises only a single yoke 50, the first non-yoke arm 43 and the second non-yoke arm 44 are both adjacent to the same yoke arm 40*a*, the arms 40 comprising only a single yoke arm 40*a*.

The outer shroud 30 comprises ribs 60 formed on the outer wall 32 of said shroud 30 which participate in the increase of the buckling resistance of the exhaust casing 10, and in particular of the outer shroud 30.

The ribs 60 are formed on either side of the lugs 51 of each of the yokes 50, and are aligned with said lugs 51 to which the ribs 60 are connected. The ribs 60 are formed in the extension of the continuation of the lugs 51. Thus, the ribs are located in the corresponding plane perpendicular to the axis $\Omega$ of said lugs 51. A rib comprises a first end connected to a lug and a second end opposite to the first end.

Each of the ribs 60 form, in the radial direction, a constant excess thickness of the outer shroud 30 which extends the variable excess thickness of said outer shroud 30 formed by each of the lugs 51. The transition between the lugs 51 and the ribs 60 is progressive so as not to form ridges at which the mechanical forces are concentrated. The ribs 60 preferably have a width, in the axial direction, identical to the lugs 51.

The excess thicknesses created by the ribs 60, which are joined by the lugs 51, form the stiffeners of the outer shroud 30 extending substantially transversely with respect to the axis $\Omega$. These stiffeners formed by the ribs 60 increase the resistance to bending of the outer shroud at the yokes 50, thus increasing the resistance of the exhaust casing to buckling.

In fact, during the loss of a fan blade, the loads created by this blade loss come from an imbalance of the low-pressure shaft which is connected to said fan. These loads are therefore transmitted to the exhaust casing by the central hub 20 which is attached to bearings which are themselves attached to the low-pressure shaft. The exhaust casing 10 being attached to the turbine engine by the yokes 50, the mechanical forces due to these loads are concentrated at the yoke arms 40*a* and at the portion of the outer shroud 30 located in proximity to said yokes 50. The buckling of the exhaust casing 10 is then caused by the bending of the outer shroud 30 and the yoke arms 40*a* when the mechanical forces become too high.

Thus, reinforcing locally the thickness of the outer shroud 30 at the yokes 50 by forming the ribs 60 makes allows the resistance to buckling of the exhaust casing to be increased while still limiting the increase in the mass of said exhaust casing due to the local increases of thickness of the outer shroud 30.

Moreover, this solution is particularly advantageous when the exhaust casing 10 is an exhaust casing with tangential arms. An exhaust casing 10 with tangential arms is an exhaust casing 10 the arms 40 whereof are inclined with respect to a radial direction defined by a straight line normal to the axis $\Omega$. The arms 40 being inclined with respect to the normal to the axis $\Omega$, the resistance to buckling of the exhaust casing 10 is smaller.

However, the invention also applies to an exhaust casing 10 the arms 40 whereof are radial, i.e. oriented along a straight line perpendicular to the axis $\Omega$.

In the embodiments wherein the outer shroud 30 comprises several yokes 50, hence at least two yokes 50, the ribs 60 formed on the outer shroud 30 comprise, on the one hand, central ribs 61 the first and second ends whereof interconnect the lugs 51 of two adjacent yokes 50, and on the other hand the exterior ribs 62, the respective first end whereof is connected to a single lug 51.

It is understood that "connected to a single lug 51" means that the exterior ribs 62 are connected only to a single lug 51 of the yoke 50, differing from the central ribs 61 connected to two lugs 51, but that said exterior ribs 62 can be connected to other elements located on the outer shroud 30, such as pipe attachments for example.

The fact that the lugs 51 of adjacent yokes 50 are connected by central ribs 61 allows a continuous stiffener to be created, thus preventing the creation of weak zones between the yokes 50 due to a local stop of said stiffener created by the ribs 60.

In the embodiment wherein the outer shroud 30 comprises a single yoke 50 comprising a single lug 51, the outer shroud 30 comprises only two exterior ribs 62 located on either side of said lug 51, the first ends of the two ribs 62 being connected to the lug 51.

In the embodiment wherein the outer shroud 30 comprises only two yokes 50 each comprising a single lug 51, the outer shroud 30 comprises a single central rib 61 connecting the two lugs 51, as well as two exterior ribs 62 connected to said lugs opposite to the central rib 61.

In the embodiment wherein the outer shroud 30 comprises only three yokes 50 each comprising a single lug 51, the outer shroud 30 comprises two central ribs 61 located on either side of the lug 51 of the yoke 50 located in the center of the three yokes 50, as well as two exterior ribs 62 each connected to a lug 51 opposite to the central ribs 61.

According to an advantageous variant, the exterior ribs 62 include their first end which is connected to a lug 51 and their second end which stops at the top 42 of an arm 40. The second end of the exterior ribs 62 is then located facing the top 42 of an arm 40. This variant allows the resistance to buckling of the exhaust casing 10 to be increased because the stiffener formed by the ribs 60 terminates at each of its ends at the top 42 of an arm 40, thus avoiding concentrating the mechanical forces in a portion of the outer shroud 30 located between two arms 40 and therefore having less resistance to bending.

Preferably, the second end of the exterior ribs 62 terminates respectively at the top 42 of the first non-yoke arm 43 and at the top 42 of the second non-yoke arm 44. This feature is a good compromise for the length of the stiffener formed by the ribs 60 between the improvement of the resistance to bending of the outer shroud 30 and the increase in mass due to the formation of the ribs 60. Moreover, it is advantageous that the stiffener formed on the edge of the outer shroud 30 by the ribs 60 does not have too great a length due to the dilation of said outer shroud 30 during operation of the turbine engine due to the effect of heat. In fact, the local excess thickness formed by the ribs 60 has a greater thermal inertia than the rest of the outer shroud 30 which is thinner, which can generate mechanical forces negatively impacting the lifetime of the exhaust casing 10 if the ribs 60 extend over too great a portion of the edge of said outer shroud 30.

The outer shroud 30 can comprise a first zone A on which said outer shroud 30 has a first thickness, a second zone B on which said outer shroud 30 has a second thickness smaller than the first thickness, and a third zone C on which said outer shroud 30 has a third thickness which is smaller than the second thickness.

The first zone A corresponds to the ribs 60, which have for example a thickness of 15 mm in the radial direction. The second zone B extending from the top 42 of the first non-yoke arm 43 to the top 42 of the second non-yoke arm 44 while covering the top 42 of the yoke arms 40a. The second thickness can for example be 6 mm. The second zone B allows additional reinforcing of the resistance to bending of the outer shroud at the yokes 50. The third zone C covers the rest of the outer shroud 30 which does not correspond to the first zone A and to the second zone B. The third thickness can for example be 4 mm.

According to a possible variant illustrated in FIGS. 3 to 7, wherein the yokes 50 comprise several parallel lugs 51 spaced axially from one another, the outer shroud 30 comprises several rows of ribs 60 which are parallel and spaced axially from one another. Each row of ribs corresponds to a row of lugs of the yokes 50. Thus, when the yokes 50 each comprise two lugs 51, the outer shroud 30 comprises two parallel rows of ribs 60.

In the variant wherein the outer shroud 30 comprises only a single yoke 50 which comprises several lugs 51, said shroud 30 comprises as many parallel rows of ribs 60 each comprising only who exterior ribs 62 as the number of lugs 51 which the single yoke 50 comprises.

The rows of ribs 60 can have a different thickness depending on the radial direction. Thus, for example, a first row of ribs 60 can have a thickness of 13 mm while a second row can comprises a thickness of 15 mm.

For an exhaust casing 10 as illustrated in FIGS. 3 to 7, the outer shroud 30 whereof comprises three yokes 50 which each form two lugs 51, the ribs 60 therefore comprising parallel rows each formed from two central ribs 61 and two exterior ribs 62, there is obtained an increase of approximately 10% in the resistance to buckling with respect to an exhaust casing of the same diameter according to the prior art, while still reducing mass by approximately 1%.

The exhaust casing 10 can be obtained by welding several panels obtained by casting which form the portions of said exhaust casing 10, such as for example portions of the outer shroud 30, said panels being assembled together to form said exhaust casing 10.

Figures 7, 8, 9:
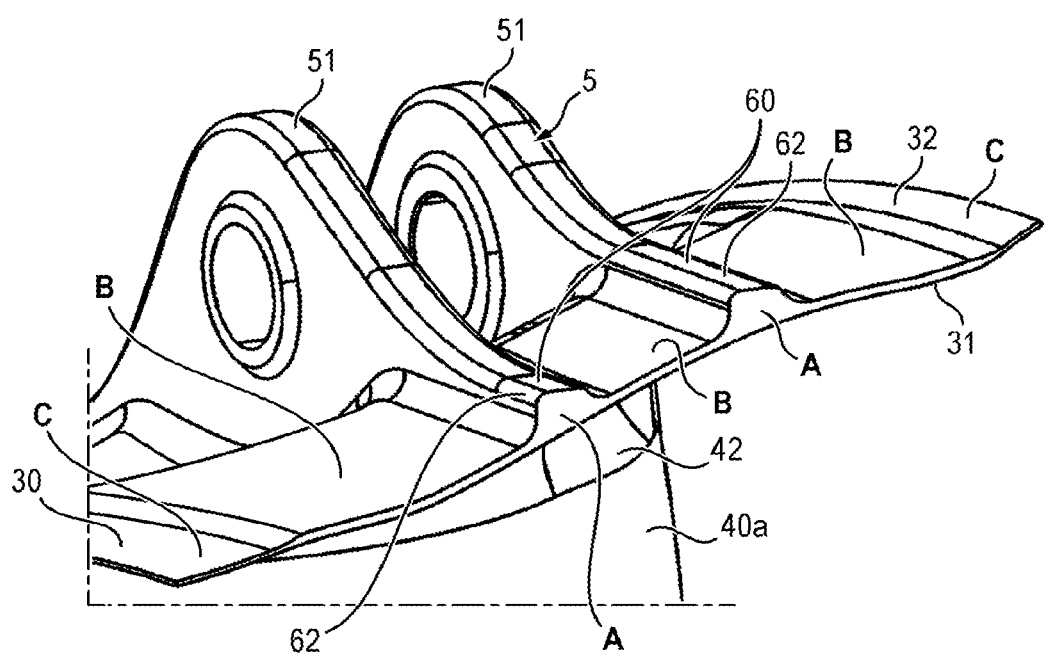
FIG. 7 shows a section of the outer shroud as illustrated in FIG. 3 at the ribs formed at the ends of the lugs of the yokes.
FIG. 8 shows a method for manufacturing an exhaust casing according to a first possible implementation of the invention.
FIG. 9 shows a method for manufacturing an exhaust casing according to a second possible implementation of the invention.

According to a first implementation of the invention, the exhaust casing 10 can be obtained by a manufacturing process as illustrated in FIG. 8 comprising the following steps:

step 100: assembling at least one panel with second panels, said at least one first panel forming an annular portion of the outer shroud 30 and comprising at least one yoke 50 which forms at least one lug 51 protruding toward the exterior of said at least one first panel, said at least one first panel also comprising ribs 60 which form a constant excess thickness of said at least one first panel, which are located on either side of said at least one lug 51 of said at least one yoke 50 in the continuation of said at least one lug 51, and which are aligned with said at least one lug 51 of said at least one firs panel, the second panels each forming an annular portion of the outer shroud 30, so as to form the complete outer shroud 30.

The number of yokes 50 which the outer shroud 30 obtained by this manufacturing method variant comprises is adapted to the number of first panels supplied. Moreover, in order to form an outer shroud with three adjacent yokes 50, for example, three first panels are assembled together, by welding for example.

In this manufacturing method variant, the ribs 60 can be formed by portions of ribs located on different panels which, once assembled, align in the same plane perpendicular to the axis Ω and form in succession different portions of the ribs so as to constitute said ribs 60.

According to a second implementation of the invention, the exhaust casing 10 can be obtained by a manufacturing method as illustrated in FIG. 9 comprising the following steps:

step 200: machining an exterior wall 32 of an outer shroud 30, said outer shroud 30 comprising at least one yoke 50 forming at least one lug 51 which protruded toward the exterior of said outer shroud 30, while forming ribs 60 on either side of said at least one lug 51, said ribs 60 forming a constant excess thickness of said outer shroud 30, and being aligned with said at least one lug 51.

The ribs 60 are therefore formed in this embodiment by removal of material on the outer surface 32 of the outer shroud 30. Before the machining step, the outer shroud 30 therefore comprises, at the at least one yoke 50, a transitional thickness greater than the final thickness, so that the ribs 60 can be formed.

In the embodiments presented above, the yokes 50 are grouped on the same zone of the outer shroud 30, thus forming a unique attachment zone of the outer shroud 30. However, according to a possible variant, the yokes 50 can be isolated by being distributed over the edge of the outer shroud 30. According to one possible example, the yokes 50 are equally distributed over the edge of the outer shroud 30, for example by forming two diametrically opposed yokes 50 on the outer shroud 30, or for example by forming three yokes 50 angularly spaced by 120°. However, other configurations of yoke 50 distributions along the edge of the outer shroud 30 are possible.

In the variant according to which the yokes 50 are isolated, the ribs 60 formed on either side of said or of the lug(s) 51 of the isolated yokes 50 comprise only the exterior ribs 62.

The invention claimed is:

1. An exhaust casing of a turbine engine for an aircraft, said exhaust casing extending along an axis and comprising:
 a central hub; and
 an annular outer shroud and arms which connect the central hub to the outer shroud, said outer shroud comprising at least one yoke for attaching the exhaust casing to a turbine engine support, the at least one yoke being located on the outer shroud and comprising at least one lug extending in a plane perpendicular to the axis and protruding radially away from said outer shroud,
 wherein the outer shroud comprises ribs which are located on either side of said at least one lug, and which are aligned with said at least one lug, each of the ribs comprising a first end connected to said at least one lug, and each of the ribs forming radially an excess thickness of the outer shroud, and
 wherein the arms each comprise a top connected to the outer shroud and a root connected to the central hub, and wherein two ribs comprise a second end which stops with each facing the top of one of the arms.

2. The exhaust casing according to claim 1, wherein the outer shroud comprises only two yokes, each comprising a single lug, the outer shroud comprising a central rib interconnecting the lugs of said two yokes, and two exterior ribs connected to said single lugs opposite to the central rib.

3. The exhaust casing according to claim 1, wherein the arms comprise yoke arm located facing a yoke, and non-yoke arms forming a remainder of said arms said non-yoke arms comprising a first non-yoke arm and a second non-yoke arm which are both adjacent to said yoke arm, the second ends of the two ribs stopping respectively facing the top of the first non-yoke arm and facing the top of the second non-yoke arm.

4. The exhaust casing according to claim 3, wherein the outer shroud comprises:
   a first zone corresponding to the ribs on which said outer shroud has a first thickness;
   a second zone extending from the top of the first non-yoke arm to the top of the second non-yoke arm while covering the top of the yoke arm, and on which said outer shroud has a second thickness which is smaller than the first thickness; and
   a third zone extending over a remainder of said outer shroud, and on which said outer shroud has a third thickness which is smaller than the second thickness.

5. The exhaust casing according to claim 1, wherein the yoke comprises two parallel lugs which are axially spaced from one another, and wherein the outer shroud comprises two rows of ribs located on either side of each of the two lugs and which are parallel and axially spaced from one another.

6. The exhaust casing according to claim 1, wherein said exhaust casing is an exhaust casing with tangential arms.

7. A turbine engine for aircraft comprising an exhaust casing according to claim 1.

8. A method for manufacturing an exhaust casing according to claim 1, the method comprising:
   assembling at least one first panel with second panels, said at least one first panel forming an annular portion along the axis of the outer shroud comprising the at least one yoke comprising the at least one lug extending in the plane perpendicular to the axis and protruding radially away from said at least one first panel, said at least one first panel further comprising the ribs which are located on either side of said at least one lug, and which are aligned with said at least one lug, and the second panels each forming an annular portion along the axis of the outer shroud.

9. A method for manufacturing an exhaust casing according to claim 1, the method comprising:
   machining an exterior wall of the annular outer shroud along the axis which comprises the at least one yoke comprising the at least one lug extending in the plane perpendicular to the axis and protruding radially away from said outer shroud, while forming ribs on either side of said at least one lug of said at least one yoke, and which are aligned with said at least one lug.

* * * * *